(12) United States Patent
Quiroga et al.

(10) Patent No.: US 8,105,984 B2
(45) Date of Patent: Jan. 31, 2012

(54) REDUCED ABRASION DRILLING FLUID

(75) Inventors: Freddy Quiroga, Caracas (VE); George Quercia, Caracas (VE); Richard Rengifo, Miranda (VE); Manuel Mas, Caracas (VE)

(73) Assignee: Intevep, S.A., Caracas (VE)

( * ) Notice: Subject to any disclaimer, the term of this patent is extended or adjusted under 35 U.S.C. 154(b) by 274 days.

(21) Appl. No.: 12/349,588

(22) Filed: Jan. 7, 2009

(65) Prior Publication Data

US 2010/0170719 A1 Jul. 8, 2010

(51) Int. Cl.
- C09K 8/24 (2006.01)
- C09K 8/05 (2006.01)
- C09K 8/02 (2006.01)
- C09K 8/22 (2006.01)
- C09K 8/32 (2006.01)
- C09K 8/36 (2006.01)
- C09K 8/00 (2006.01)
- C09K 8/04 (2006.01)
- E21B 21/00 (2006.01)
- E21B 7/00 (2006.01)
- E21B 7/18 (2006.01)

(52) U.S. Cl. ........ 507/125; 507/100; 507/103; 507/117; 507/118; 507/138; 507/140; 507/145; 175/65; 175/72

(58) Field of Classification Search .......... 507/117, 507/125, 100, 103, 118, 138, 140, 145; 175/65, 175/72
See application file for complete search history.

(56) References Cited

U.S. PATENT DOCUMENTS

| | | | | |
|---|---|---|---|---|
| 2,298,984 | A | * 10/1942 | Stinson et al. | 507/140 |
| 5,883,054 | A | 3/1999 | Hernandez et al. | |
| 6,017,854 | A | * 1/2000 | Van Slyke | 507/118 |

FOREIGN PATENT DOCUMENTS

CA 1135039 11/1982

OTHER PUBLICATIONS

Canadian Office Action for Application No. 2,684,264 dated May 30, 2011.
Cuban Office Action for Application No. 201-2009 dated Oct. 22, 2010.

* cited by examiner

*Primary Examiner* — Timothy J. Kugel
*Assistant Examiner* — Atnaf Admasu
(74) *Attorney, Agent, or Firm* — Bachman & LaPointe, P.C.

(57) ABSTRACT

A reduced abrasion drilling fluid system and method of drilling a borehole by circulating the reduced abrasion drilling fluid through the borehole is disclosed. The reduced abrasion drilling fluid comprises a drilling fluid, a first additive and a weighting agent, wherein the weighting agent has a particle size of at least 90% by volume less than 50 μm.

32 Claims, 2 Drawing Sheets

REDUCED ABRASION DRILLING FLUID

BACKGROUND OF THE INVENTION

This invention relates to drilling fluids and methods for drilling boreholes. More particularly, the invention relates to reduced abrasion thermally stable drilling fluids which include a first additive that absorbs onto the surface of the weighting agent thus reducing abrasion.

The rotary drilling of a borehole is accomplished by rotating a drill string having a drill pipe and a drill bit at its lower end. Weight is applied to the drill bit while rotating to create a borehole into the earth. The drill is hollow and sections are added to the drill string to increase its length as the borehole is deepened. This rotary drilling process creates significant amounts of friction which produces heat along with fragments of strata.

The drilling fluid or mud primarily functions as a medium to carry these fragments of strata or cuttings produced by the drill bit to the surface. Additionally, the drilling fluid serves as a lubricant for the bit and the drill string, and prevents the ingress of formation fluids such as oil, gas and salt water into the borehole while drilling proceeds.

Oil based drilling fluids are used worldwide in on shore and off shore drilling locations. Oil based drilling fluids are utilized because of their capacity for shale inhibition, their high lubricity, their ability to biodegrade in aerobic and anaerobic environments and for their tendency to maintain rheologic properties at high temperatures and high pressures. For these reasons, oil based muds are used to drill deep subterranean wells.

In order to prevent the collapse of the borehole and ingress of formation fluids while drilling deep subterranean wells using oil based muds, hydrostatic pressure in the fluid column must be maintained. The hydrostatic pressure must be maintained throughout the fluid column to the bottom hole. The pressure is maintained by increasing the density of the drilling fluid through the addition of high concentrations of weighting agents. These weighting agents are generally in the form of finely divided solids of a material which has a high intrinsic density.

High concentrations of weighting agents increase the adverse rheologic properties, such as plastic viscosity (Vp), of the drilling fluid. The high concentrations of weighting agents also reduce the amount of cuttings the drilling fluid can transport. The concentration of the weighting agent is related to its specific gravity. If the specific gravity of the weighting agent is low the concentration of the weighting agent in the drilling fluid will be higher.

For example: A drilling fluid mud with a density of 12 ppg (pounds per gallon) is split into two samples. Sample 1 includes a weighting agent of barite with a specific gravity of 4.2. Sample 2 includes a weighting agent of calcium carbonate with a specific gravity of 2.4. Sample 1 with the weighting agent of higher specific gravity and thus the lower concentration of weighting agent in the mud will produce better rheological properties than Sample 2 with the lower specific gravity of weighting agent and thus the higher concentration of weighting agent in the mud.

To create a drilling fluid with excellent rheologic properties, weighting agents of higher density and higher specific gravity are employed. Minerals with high specific gravities are hard and abrasive. These properties lead to erosion of drilling equipment such as mud pumps, directional tools and drill strings.

It is therefore clear that the need remains for a reduced abrasion drilling fluid that is stable at high temperatures and high pressures.

SUMMARY OF THE DISCLOSURE

The present specification discloses a reduced abrasion oil based drilling fluid that is stable at high temperatures and high pressures.

The present specification further discloses a method for drilling a borehole which comprises circulating a reduced abrasion oil based drilling fluid that is stable at high temperatures and high pressures through the borehole.

According to the present invention a reduced abrasion oil drilling fluid system is provided which comprises a drilling fluid, a first additive and a weighting agent, wherein the weighting agent has a particle size at least 90% by volume less then 50 μm.

BRIEF DESCRIPTION OF THE DRAWINGS

A detailed description of preferred embodiments of the present invention follows, with reference to the attached drawings, wherein.

DETAILED DESCRIPTION

Figure 1:
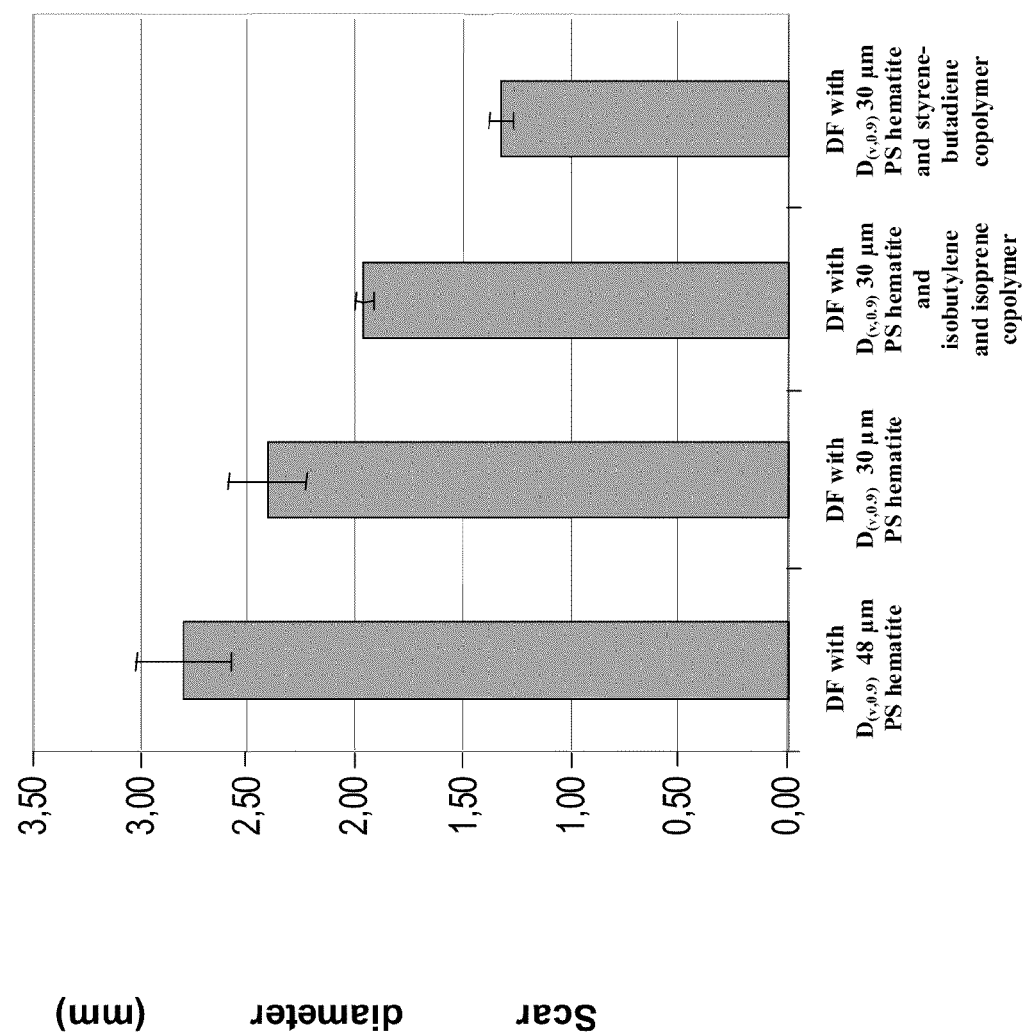
FIG. 1 graphically compares the abrasiveness of a drilling fluid of the present disclosure with weighted oil based drilling fluids.

The present disclosure relates to a thermally stable drilling fluid system comprising a weighting agent with particle sizes of at least 90% by volume less than 50 μm and a first additive which serves to provide enhanced thermal stability of the drilling fluid and excellent fluid loss control under both high temperature and high pressure conditions. This disclosure is related to U.S. Pat. No. 5,883,054 which is hereby incorporated by reference in its entirety.

In accordance with the present disclosure a weighting agent is incorporated into a drilling fluid. The drilling fluid may be oil based. The oil used in oil drilling fluids may comprise gasoil, mineral oil, diesel, synthetic oil, vegetable oil, their derivatives and combinations thereof.

The weighting agent may be any hard, non-hydrate mineral having a specific gravity of about 4.3 or higher and a hardness on a Mohs scale of at least 4.3. Non limiting weighting agents that may be used in the present disclosure include calcium carbonate, barite, celestite, galena, hematite, ilmenite, goethite, iron oxides and mixtures thereof. For example the weighting agent may be a non-hydrated hematite with a specific gravity between about 4.8 g/cc and about 5.2 g/cc, such as ORIMATITA® which is a trademark for a hematite product registered by Petróleos de Venezuela, S.A. (PDVSA) with a specific gravity between 4.8 g/cc to 5.1 g/cc.

The first additive may be a polymer, a copolymer, a monomer or mixtures thereof. The first additive reduces abrasion by increasing the viscosity of the drilling fluid or by absorbing on to the irregular surface of the weighting agent. The first additive may be any oil soluble polymer such as styrene polymer, styrene copolymer, butadiene, isoprene, isoprene copolymer, styrene-butadiene, copolymer styrene-butadiene, methacrylate, isobutylene, polyisobutylene and mixtures thereof. Generally, the first additive may be any polymer that is soluble in oil, such as INTOIL®-P which is a trademark for a 1, 3 butadiene styrene copolymer product registered by Petróleos de Venezuela, S.A. (PDVSA).

A particularly useful first additive is styrene-butadiene copolymer that is added to the drilling fluid in an amount of about 1 pound per barrel (ppb) of drilling fluid to about 6 ppb of drilling fluid, for example first additive may be added to the drilling fluid in the amount of about 2 ppb to about 4 ppb. The styrene-butadiene copolymer used in the present disclosure may have a styrene content of about 10%, preferably about 23% and an average molecular weight of greater than about 10,000 g/mol, preferably greater than about 500,000 g/mol.

The first additive absorbs to the surfaces of the smaller particle sized weighting agent to fill and smooth rough surfaces of the weighting agent thus reducing the abrasiveness of the drilling system by increasing the rheological properties and improving the fluid loss control of the drilling system. A weighting agent particle size of at least 90% by volume, D(v,0.9), less than 50 (μm) microns has been proven effect with improved results as the particle size of the weighting agent is reduced.

Weighting agent particle sizes that have been proven effective include weighting agents with a particle size of from about 1 micron to at least $D_{(v,0.9)}$ less than 38±1.5 microns, i.e. about 36.5 microns to about 39.5 microns. The particle size distribution may contain at least $D_{(v,0.1)}$ of the weighting agent in the range of less than 2±1.5 microns, at least $D_{(v,0.5)}$ of the weighting agent in the range of less than 15±1.5 microns, and at least $D_{(v,0.9)}$ of the weighting agent in the range of less than 38±1.5 microns. Effective weighting agent particle sizes also include particle sizes where at least 85% by weight (w/w) of the weighting agent passes through a 325 mesh screen, preferably where about 90% w/w to about 92% w/w of the weighting agent passes through a 325 mesh screen, and where at least 98% of the weighting agent passes through a 200 mesh screen.

According to the present disclosure, a drilling fluid system is provided which includes oil, a weighting agent, a first additive, a second additive, lime and organophilic clay.

The organophilic clay for use in the drilling system is a clay selected from the group consisting of hectorite, bentonite and mixtures thereof.

The second additive may comprise at least one of the following: an emulsifier, a wetting agent, a fluid loss control agent, a viscosity increasing agent, a polar activator, barite, and combinations thereof.

Suitable emulsifiers and wetting agents include surfactants, ionic surfactants such as fatty acids, amines, amides and organic sulphonates, and mixtures of any of these with non-ionic surfactants such as ethoxylated surfactants.

Suitable fluid loss control agents include oil soluble polymers, such as styrene-butadiene copolymer, oxidized asphalt, gilsonite or amine-treated lignite and the like.

Suitable polar activators include carboxylate anionic emulsifiers, oxidized tall oil fatty acids, condensed amines and the like.

TABLE 1

| Product | 16.5 ppg | |
|---|---|---|
| Mineral Oil, ppb | 189.8 | 189.8 |
| Organophillic clay, ppb | 8 | 8 |
| Wetting agent, ppb | 3 | 3 |
| Lime, ppb | 2 | 2 |
| Fluid loss control agent, ppb | 8 | 8 |
| Polar Activator, ppb | 6 | 6 |
| Barite, ppb | | |
| ORIMATITA ®, ppb | 477.1 | 477.1 |
| First Additive, ppb | — | 3.5 |

The composition of the drilling fluids or muds used in the present disclosure are shown in Table 1. Products and concentrations are listed in the order they are added to the mix. The components are mixed to create a weighted oil based drilling fluid.

TABLE 2

| | 16.5 ppg | |
|---|---|---|
| Properties | A/B ORIMATITA ® | A/B ORIMATITA ® + First Additive |
| Plastic Viscosity, cp | 33/42 | 52/45 |
| Yield point, lb/100 sq. ft. | 17/33 | 14/16 |
| 10 sec gel, lb/100 sq. ft. | 26/39 | 11/10 |
| 10 min gel, lb/100 sq. ft. | 76/70 | 27/25 |
| 600 rpm reading | 83/117 | 118/106 |
| 300 rpm reading | 50/75 | 60/61 |
| 200 rpm reading | 40/62 | 48/43 |
| 100 rpm reading | 29/47 | 29/25 |
| 6 rpm reading | 17/26 | 8/7 |
| 3 rpm reading | 16/25 | 7/6 |
| Abrasiveness, mg/min | 0.6575 | 0.0035 |

A (After)/B (Before) aging at 250° F./16 hr

As can be shown by Table 2, the 16.5 pound per gallon (ppg) fluid prepared from the compositions detailed in Table 1 shows a reduced abrasiveness of the ORIMATITA® weighted drilling fluid when the ORIMATITA® weighted drilling fluid is combined with a first additive, such as INTOIL®-P. The abrasiveness test with modifications was run as described in API-RP13I. The test was modified to include a whole oil mud instead of a bentonite suspension and the test was performed with a time of 40 minutes.

An ASTM D4172 four ball abrasion test was performed on various 16 ppg drilling fluids. The standard ASTM D4172 test was modified to include a whole oil mud instead of oil based grease, the test time was 30 minutes and the temperature was set at 150° F.

The results are detailed in FIG. 1. The scar abrasive wear of weighted drilling fluid with a weighting agent, such as ORIMATITA®, comprising a particle size distribution of at least 90% in volume under 48 microns ($D_{(v,0.9)}$ of 48 μm) 1, weighted drilling fluid $D_{(v,0.9)}$ of 30 μm 2, weighted drilling fluid $D_{(v,0.9)}$ of 30 μm with a first additive, such as polyisobutylene (isobutylene and isoprene copolymer) a commercial viscosity index improver 3, and weighted drilling fluid $D_{(v,0.9)}$ of 30 μm with a first additive, such as INTOIL®-P 4 were performed. FIG. 1 shows that the weighted mud abrasiveness 1 was drastically reduced as the particle size of the weighting agent was reduced 2 and the abrasiveness was even further reduced with an addition of a first additive 3 and 4.

Figure 2:
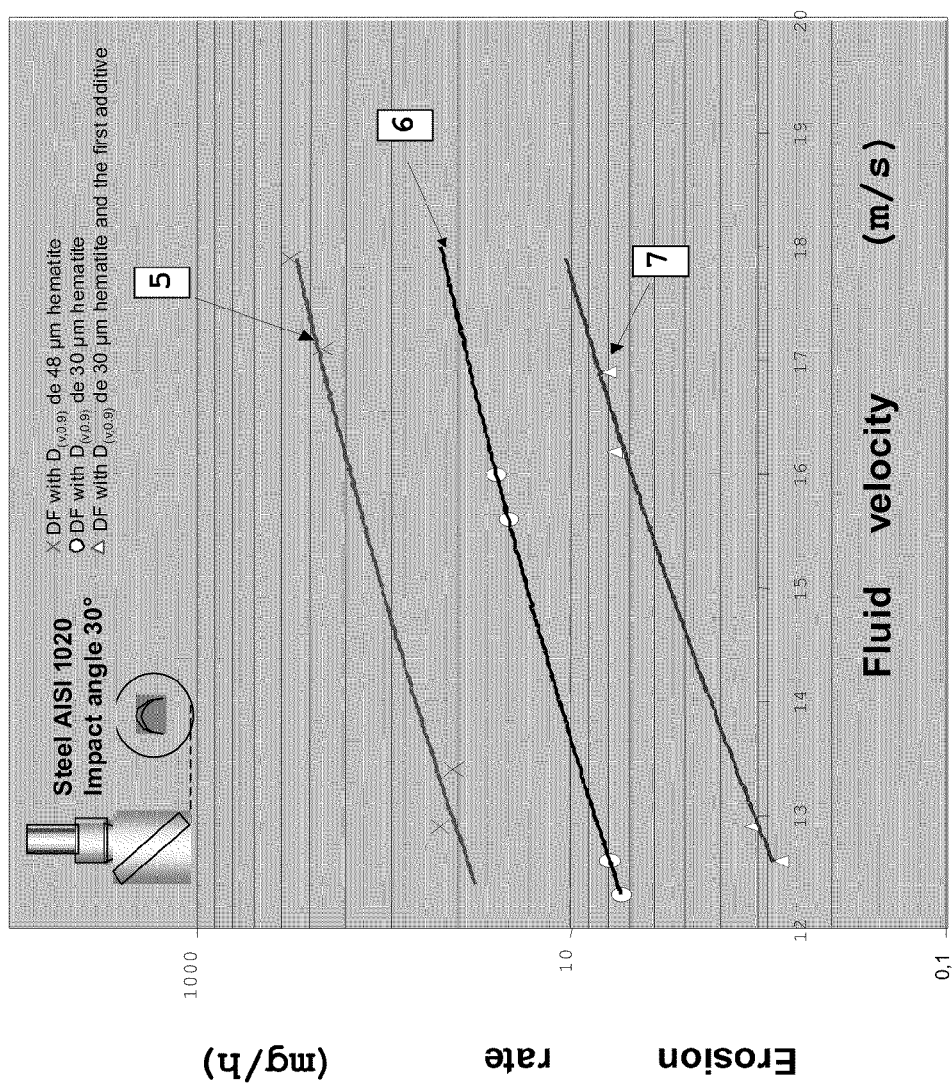
FIG. 2 graphically compares the erosion profile of a drilling fluid of the present disclosure with weighted oil based drilling fluids.

In FIG. 2 the erosion rate vs. the fluid velocity is shown. As can be seen, the erosion rate of a $D_{(v,0.9)}$ of 48 μm weighted drilling fluid 5 is drastically higher than the erosion rate of a $D_{(v,0.9)}$ of 38 μm weighted drilling fluid 6. FIG. 2 shows both weighted drilling fluids 5 and 6 erode at a faster rate then the weighted oil based drilling fluid which incorporates a first additive 7.

The reduced abrasion drilling fluid of the present disclosure enhances the Theological properties of the drilling fluid. The reduced abrasion drilling fluid of the present disclosure is stable at temperatures up to 400° F. and pressures up to 22,000 psi (pounds per square inch).

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A reduced abrasion drilling fluid system comprising a drilling fluid, a weighting agent, and a first additive selected from the group consisting of a polymer, a copolymer, a monomer and mixtures thereof, wherein the weighting agent has a particle size distribution of at least 10% by volume less than about 2 μm, of at least 50% by volume less than about 15 μm, and of at least 90% by volume less than about 38 μm.

2. A reduced abrasion drilling fluid system of claim 1, wherein at least 85% w/w of the weighting agent passes through a 325 mesh screen.

3. A reduced abrasion drilling fluid system of claim 1, wherein about 90% w/w to about 92% w/w of the weighting agent passes through a 325 mesh screen.

4. A reduced abrasion drilling fluid system of claim 1, wherein at least 98% w/w of the weighting agent passes through a 200 mesh screen.

5. A reduced abrasion drilling fluid system of claim 1, wherein the weighting agent is a hard non hydrated mineral.

6. A reduced abrasion drilling fluid system of claim 1, wherein the weighting agent is selected from the group consisting of calcium carbonate, barite, celestite, galena, hematite, ilmenite, goethite, iron oxides and mixtures thereof.

7. A reduced abrasion drilling fluid system of claim 1, wherein the weighting agent has a hardness on a Mohs scale of at least 4.3.

8. A reduced abrasion drilling fluid system of claim 1, wherein the weighting agent has a specific gravity of at least 4.3 g/cc.

9. A reduced abrasion drilling fluid system of claim 1, wherein the weighting agent is non-hydrated hematite with a specific gravity between about 4.8 g/cc and about 5.2 g/cc.

10. A reduced abrasion drilling fluid system of claim 1, wherein the drilling fluid comprises oil and an organophilic clay.

11. A reduced abrasion drilling fluid system of claim 10, wherein the oil is selected from the group consisting of gasoil, mineral oil, diesel, synthetic oil, vegetable oil and combinations thereof.

12. A reduced abrasion drilling fluid system of claim 10, wherein the organophilic clay is selected from the group consisting of hectorite, bentonite and mixtures thereof.

13. A reduced abrasion drilling fluid system of claim 1, wherein the drilling fluid further comprises at least one additional second additive selected from the group consisting of emulsifiers, wetting agents, fluid loss control agents, viscosity increasing agents, polar activators and mixtures thereof.

14. A reduced abrasion drilling fluid system of claim 13, wherein the wetting agents are selected from the group consisting of surfactants, ionic surfactants and non ionic surfactants.

15. A reduced abrasion drilling fluid system of claim 14, wherein the wetting agents are selected from the group consisting of fatty acids, amines, amides, organic surfactants, ethoxylated surfactants and mixtures thereof.

16. A reduced abrasion drilling fluid system of claim 13, wherein the emulsifiers are selected from the group consisting of surfactants, ionic surfactants and non ionic surfactants.

17. A reduced abrasion drilling fluid system of claim 16, wherein the emulsifiers are selected from the group consisting of fatty acids, amines, amides, organic surfactants, ethoxylated surfactants and mixtures thereof.

18. A reduced abrasion drilling fluid system of claim 13, wherein the fluid loss control agents are selected from the group consisting of styrene-butadiene copolymer, oxidized asphalt, gilsonite, amine-treated lignite and combinations thereof.

19. A reduced abrasion drilling fluid system of claim 13, wherein the polar activators are selected from the group consisting of carboxylate anionic emulsifiers, oxidized tall oil fatty acids, condensed amines and combinations thereof.

20. A reduced abrasion drilling fluid system of claim 1, wherein the first additive is an oil soluble polymer.

21. A reduced abrasion drilling fluid system of claim 1, wherein the first additive is selected from the group consisting of styrene polymer, styrene copolymer, butadiene, isoprene, isoprene copolymer, styrene-butadiene, copolymer styrene-butadiene, methacrylate, isobutylene, polyisobutylene and mixtures thereof.

22. A reduced abrasion drilling fluid system of claim 1, wherein the first additive is a copolymer styrene-butadiene with a molecular weight of greater than about 10,000 g/mol.

23. A reduced abrasion drilling fluid system of claim 22, wherein the copolymer styrene-butadiene has a styrene content of about 10%.

24. A reduced abrasion drilling fluid system of claim 1, wherein the first additive is a copolymer styrene-butadiene with a molecular weight of greater than about 500,000 g/mol.

25. A reduced abrasion drilling fluid system of claim 24, wherein the copolymer styrene-butadiene has a styrene content of about 23%.

26. A reduced abrasion drilling fluid system of claim 1, wherein the first additive increases the rheological properties and improves the fluid loss control of the system.

27. A reduced abrasion drilling fluid system of claim 1, wherein the first additive maintains the rheological and fluid loss control properties of temperatures up to 400° F. and pressures up to 22,000 psi.

28. A reduced abrasion drilling fluid system of claim 1, wherein the first additive is present in an amount between about 1 ppb to about 6 ppb.

29. A reduced abrasion drilling fluid system of claim 1, wherein the first additive is present in an amount between about 2 ppb to about 4 ppb.

30. A reduced abrasion drilling fluid system according to claim 1, wherein the weighting agent is non-hydrated hematite having a specific gravity of between about 4.8 g/cc and about 5.2 g/cc, and wherein the first additive is a copolymer styrene-butadiene having a molecular weight of greater than about 500,000.

31. A method for drilling a borehole into the ground comprising the steps of:
   making a reduced abrasion oil based drilling fluid by mixing an oil, an organophilic clay, a wetting agent, lime, a fluid loss control agent, a viscosity increasing agent, a polar activator, a weighting agent, and a first additive, wherein the first additive is an oil soluble polymer selected from the group consisting of styrene polymer, styrene copolymer, butadiene, isoprene, isoprene copolymer, styrene-butadiene, copolymer styrene-butadiene, methacrylate, isobutylene, polyisobutylene and mixtures thereof, and wherein the weighting agent has a particle size distribution of at least 10% by volume less than about 2 μm, of at least 50% by volume less than about 15 μm, and of at least 90% by volume less than about 38 μm; and
   circulating the reduced abrasion oil based drilling fluid through the borehole.

32. The method of claim 31, wherein the weighting agent is non-hydrated hematite having a specific gravity of between about 4.8 g/cc and about 5.2 g/cc, and wherein the first additive is a copolymer styrene-butadiene having a molecular weight of greater than about 500,000.

* * * * *